Figure 1:
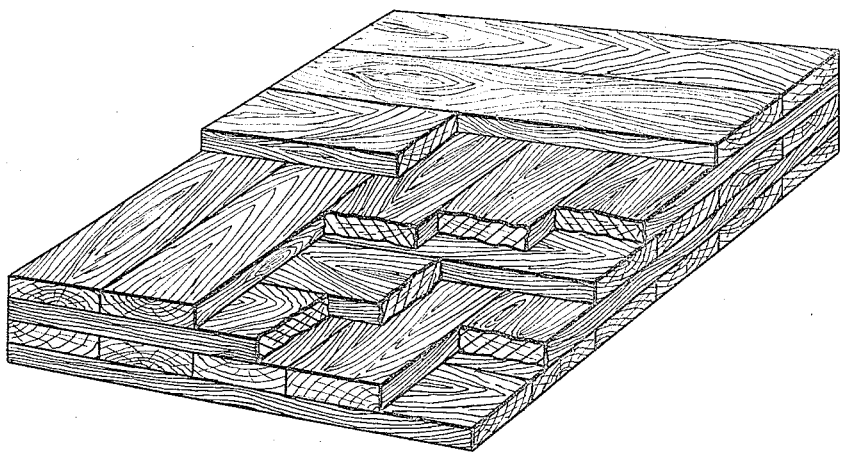

Aug. 21, 1923.

F. J. WALSH ET AL

COMPOSITE LUMBER

Filed March 17, 1920

1,465,383

Inventors
Frank J. Walsh.
Robert L. Watts.
Attorney Frank Warren

Patented Aug. 21, 1923.

1,465,383

UNITED STATES PATENT OFFICE.

FRANK J. WALSH AND ROBERT L. WATTS, OF TACOMA, WASHINGTON.

COMPOSITE LUMBER.

Application filed March 17, 1920. Serial No. 366,693.

*To all whom it may concern:*

Be it known that we, FRANK J. WALSH and ROBERT L. WATTS, citizens of the United States, residing at Tacoma, in the county of Pierce and State of Washington, have invented a certain new and useful Improvement in Composite Lumber, of which the following is a specification.

This invention relates to improvements in composite lumber and the method of forming the same, and has for its object to provide a composite lumber that is formed of a plurality of pieces of soft wood held together by cement or equivalent means and then compressed with pressure sufficient to effect certain beneficial changes in the physical properties of the composite mass and thereby produce a new article of manufacture suitable for many commercial purposes in which the original wood could not be used, and in which its properties render it superior to other existing substances. It is particularly suited to the manufacture of articles such as pulleys, for example, which require toughness, durability, high coefficient of friction, and elimination of noise.

The superior quality of our composite lumber results in the combined effect of three factors, viz, the natural characteristics of the wood, the laminated structure in which it is built up, and the relation of the fibers of the wood to each other resulting from the compression to which the mass has been subjected.

We have found the so-called "soft woods," and particularly woods of coniferous trees, best suited for our purpose. The coniferous woods lend themselves to use in our invention by reason of their physical structure and properties, being characterized by simplicity of structure as regards fiber arrangement, and a preponderance of strong fibers or so-called "tracheids" with a minimum of medullary rays and other cell formation. In actual practice, we have found spruce wood to be the best suited for our purpose.

The preferred method of forming our composite lumber is as follows:—

A suitable wood, such as spruce for example, is cut into thin strips or boards in such manner that the grain of the wood runs lengthwise of the board or strip and, furthermore, so that each board or strip is a slash grain or tangential cut off the original log as nearly as practicable. A suitable and entirely practical thickness for such strips or boards, when spruce is employed, has been found to be approximately one-fourth of an inch. The strips or boards thus formed are then cut into suitable lengths and such lengths are then superimposed one above the other so as to form a plurality of layers, with the grain of the wood in one layer running at an angle to the grain of the wood in the adjacent layer. Each layer may be formed of a single piece cut from the original strip or board, or, if desired, each layer may be formed itself of a plurality of strips or pieces shaped so as to lie snugly and closely together. The adjacent or contact surfaces of each layer are held together and in suitable position by any suitable means, as by an efficient cement. A sufficient number of these layers are thus superimposed one upon another to form a block of any suitable or desired thickness and, before the cementing material sets, this block is subjected to an enormous pressure, whereby the several component layers are not only brought into intimate contact with each other, but the direction of the pressure is transverse to the direction of the grain in the wood in all of the several layers. The amount of pressure necessary to employ to effect the purposes of the invention will, of course, vary with different woods, but must be sufficient to compress the relatively large number of wood fibers into close frictional contact with each other, and must be carried to the point where the built-up pile or block will remain in its compressed state when the pressure is removed, that is, the pressure must be sufficient not only to bring the fibers into close frictional contact with each other, but must be such as to compress the wood beyond its elastic limit. The progressive effect of the pressure on the material is, first, to bring the layers of which the block is composed into more intimate contact with each other and to squeeze out any excess of cement, thereby giving a cement joint of maximum efficiency between the layers themselves. As the pressure increases, its progressive action on the wood is, first, against the inherent elasticity of the wood cells or structure, and up to a certain pressure this produces no permanent change in the wood since, by release of the pressure, it will return to original volume. If the pressure is only carried to this point, while it might produce a close union between the several layers, it would not materially reduce the volume of the mass of the pile or increase the density thereof, but by increasing the pressure to a sufficient degree to permanently deform or distort the natural cross-sectional shape of the cellular structure of the wood, the density of the mass is increased and, if this pressure is raised to a point beyond the elastic limit of the wood so that the same remains permanently distorted, the fibers forming the walls of the cellular tissue of the wood are brought into close, intimate frictional contact with each other, resulting in a product of great density, toughness and durability. It has been found that, by reason of the character of the wood, and particularly coniferous woods, it is possible to effect this compression without any material alteration of the fibrous element of the wood other than a change in its cross-sectional shape and cubical content, thereby rendering possible the attainment of great strength, toughness and durability in the resulting product.

The cement employed is for the purpose of permanently securing the layers together and is not designed to saturate or soak into the entire mass of the wood for the purpose of filling the pores thereof with glue or cement, since by our invention the aim is to so permanently deform the cells as to bring the fibers themselves into permanent frictional contact and engagement with each other rather than to fill the cells with glue or cement.

The amount of pressure necessary to employ to secure the practical results of our invention will, of course, vary with different woods, and the decrease in volume resulting from such applied pressure will also vary, but whatever variety of wood is employed and whatever the pressure may be, it is essential that the pressure be such as to compress the wood beyond its elastic limit and bring the fibers thereof into close frictional contact and engagement. With spruce, for example, we have found that a pressure of fifty tons per square foot is sufficient to reduce the block or pile to 60% of its original cubical content. This pressure is sufficient to overcome the elastic limit of the wood and cause it to remain permanently in its compressed condition. If a still more dense structure is desired, we have found that this may be attained, but that the ratio of increase of pressure is in inverse proportion to the decrease in the cubical content of the block. For example, to compress the block into 40% of its original cubical content requires a pressure of about 110 tons per square foot.

In order that the invention may be readily understood, we herewith present two figures of drawings, in which—

Figure 2:
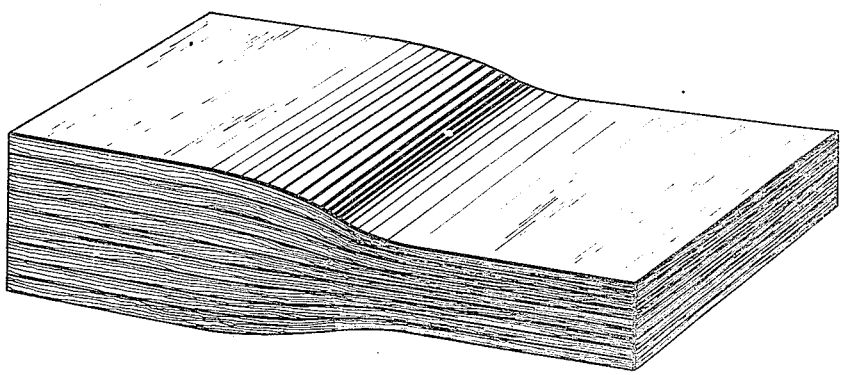

Fig. 1 is a perspective view of a pile consisting of a plurality of layers of the wood, each layer itself consisting of a plurality of pieces, partially broken away for a better understanding of the structure of the pile; and Fig. 2 is a perspective view of a pile of superimposed layers, each layer consisting of but a single piece of the wood, the left-hand end of Fig. 2 showing the pile in its uncompressed, and the right-hand end thereof in its compressed condition.

Referring more specifically to Fig. 1, it will be observed that the grain of the wood runs lengthwise of the layer and that the layers are arranged in such manner that the grains of adjacent layers extend at an angle, and practically at right angles, to each other. In Fig. 2, the grains of the adjacent layers are at substantially right angles to each other, the same as shown in Fig. 1, the sole difference between the two methods of forming the original piles of layers lying in the fact that, in Fig. 1, each layer itself is composed of a plurality of pieces, whereas in Fig. 2 each layer is composed of a single piece. It will be understood that a suitable cement is interposed between the several layers in both Fig. 1 and Fig. 2.

The pile of layers having been thus arranged, such pile is then subjected to an enormous pressure, as for example by pressure rolls or hydraulic pressure, thereby reducing the vertical height of the block or pile as shown at the right-hand of Fig. 2, to such point that, when pressure is removed, the block or pile will remain in its compressed condition, that is the pressure must be such to compress the wood beyond its elastic limit. After this point has been reached, as before pointed out, the pressure may be increased still further if desired. Since the inherent elasticity differs in different woods, or even in woods of the same species, the exact amount of pressure necessary to compress the wood beyond its elastic limit cannot be definitely stated, but those skilled in the art will be enabled to readily determine when such pressure has been applied by reason of the fact that, when the pressure is removed, the wood will remain in its compressed state.

After the applied pressure has compressed the wood to the required degree, if the pressure is immediately removed the wood may slightly expand or spring back, and we therefore prefer to compress it beyond the degree required or to retain it under pressure for some time, the length of time depending on the degree of pressure. When this is done, the "spring back" will be so small as to be negligible.

Having thus described our invention, what is claimed is:—

1. An article of manufacture, a composite lumber, composed of a plurality of layers of soft wood cemented together with the grain of the adjacent layers extending at an angle to each other and the whole compressed beyond the elastic limit of the wood.

2. As an article of manufacture, a composite lumber, composed of a plurality of layers of soft wood having a cement interposed between the layers and the grain of adjacent layers crossing each other, and the whole compressed beyond the elastic limit of the wood to bring the fibers of the wood into frictional contact with each other.

3. As an article of manufacture, a composite lumber, composed of a plurality of layers of coniferous wood having a cement interposed between the layers and the grain of adjacent layers crossing each other, and the whole compressed beyond the elastic limit of the wood to bring the fibers of the wood into frictional contact with each other.

4. The method of making a composite lumber which consists in arranging layers of wood in a pile with the grain of adjacent layers at an angle to each other and with cement between the layers and then subjecting said pile to pressure beyond the elastic limit of the wood.

5. The method of making a composite lumber which consists in arranging layers of a coniferous wood in a pile with the grain of adjacent layers at an angle to each other and with cement between the layers, and then subjecting said pile to pressure sufficient to compress the wood beyond its elastic limit and bring the fibers thereof into frictional contact.

In witness whereof, we hereunto subscribe our names this 10th day of March A. D. 1920.

FRANK J. WALSH.
ROBERT L. WATTS.